(12) United States Patent
Martin

(10) Patent No.: US 6,638,002 B1
(45) Date of Patent: Oct. 28, 2003

(54) PALLET PIN SHEET FANNER

(76) Inventor: Claire T. Martin, 08211 See Rd., Charlevoix, MT (US) 49720

( * ) Notice: Subject to any disclaimer, the term of this patent is extended or adjusted under 35 U.S.C. 154(b) by 0 days.

(21) Appl. No.: 09/932,801

(22) Filed: Aug. 17, 2001

Related U.S. Application Data

(60) Provisional application No. 60/225,975, filed on Aug. 17, 2000.

(51) Int. Cl.[7] .............................................. B65G 59/02
(52) U.S. Cl. ........................ 414/788; 271/1; 271/18.1; 271/161; 414/795.7
(58) Field of Search .................... 271/1, 18.1, 161; 414/788, 795.7, 796.5

(56) References Cited

U.S. PATENT DOCUMENTS

| | | |
|---|---|---|
| 3,080,967 A | 3/1963 | Bendix et al. |
| 4,465,415 A | 8/1984 | Eberling et al. |
| 4,743,006 A | 5/1988 | Bolle, Jr. et al. |
| 4,815,916 A | 3/1989 | Beck |
| 5,166,654 A | 11/1992 | Doyelle |
| 5,382,935 A | 1/1995 | Doyelle |

*Primary Examiner*—Janice L. Krizek
(74) *Attorney, Agent, or Firm*—Young & Basile, P.C.

(57) ABSTRACT

The invention is a magnet for facilitating separation of individual sheets from a stack of ferro-magnetic sheets; the invention is in the form of an elongate housing containing an elongate array of magnets which may be selectively positioned in relation to the housing so as to bring the array in proximity to the edge of the stack of ferro-magnetic sheets, thereby inducing a magnetic field in said sheets and causing the sheets to separate, thereby facilitating manipulation of the uppermost sheet from the stack.

10 Claims, 3 Drawing Sheets

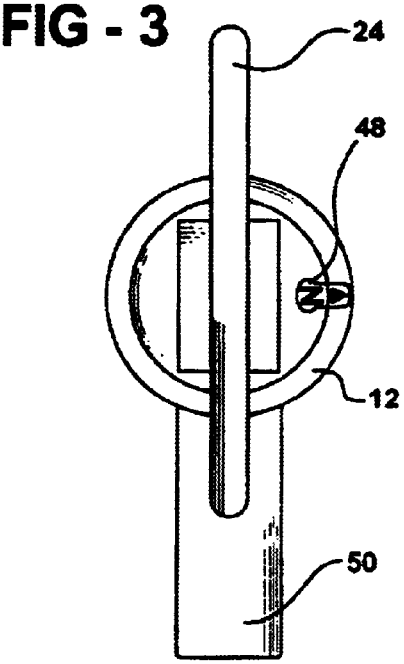
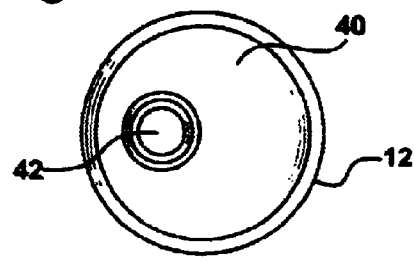
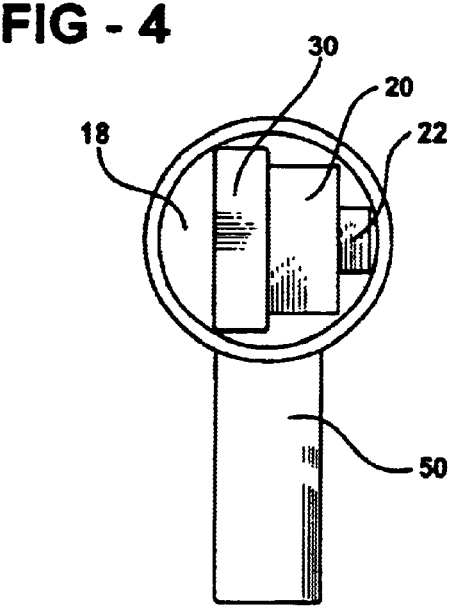
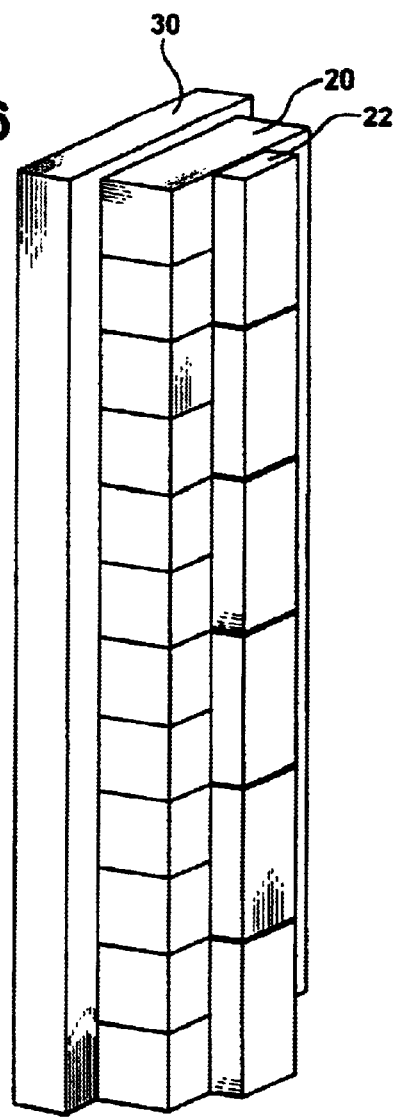

PALLET PIN SHEET FANNER

PRIORITY

This application claims priority of the provisional application #60/225,975, filed Aug. 17, 2000.

FIELD OF THE INVENTION

The invention pertains to permanent magnet devices for separating stacks of sheets of ferrous steel.

BACKGROUND OF THE INVENTION

The use of fanner magnets is well known in the manufacturing arts. Fanner magnets serve to fan out or separate sheets in a stack of metal sheets, thereby facilitating the movement or transfer of sheets utilizing handling devices, such as pickups, suction cups, or other lifting or moving devices. Such magnets operate on the principle of creating repelling polarities among the individual sheets.

There are a wide variety of methods used for separating magnetic sheets. One example is found in U.S. Pat. No. 4,815,916, issued to James A. Beck, and teaching a plurality of magnetic elevator devices disposed along the sides of a vertical stack of magnetizable steel objects, such as sheets. Another type of device is found in U.S. Pat. No. 4,743,006, issued to Fred Bole, Jr., et al., and discloses a fanner magnet assembly including a power-actuated carriage for movement relative to a stack of sheets.

However, prior sheet separators are limited in their operation, and are not particularly well adapted to separating palletized sheets of metal. When placed in pallets, a stack of steel sheets (or sheets of other ferro-magnetic composition) is typically aligned and positioned between pins on a pallet to restrain the lateral movement of the stack of sheets while the pallet is being transported and processed. Typical pallets are equipped with a large number of pallet pins located around the perimeter of the pallet which surround the sheets. These pins are placed in cavities, thereby creating a "fence" of pallet pins surrounding the sheets of ferrous material. Pallet pins may be threaded into corresponding threaded cavities in a pallet, or may be mounted using "bayonet" type locking whereby the pallet pin is engaged and disengaged relatively quickly from the cavity in a pallet by placing a plurality of pallet pins completely surrounds the steel sheets, the sheets are effectively restrained from movement in relation to the pallet.

In the manufacturing environment, pallets equipped with pallet pins surrounding a stack of metal sheets are transported to the vicinity of an industrial processing machine. Typically, an external-type sheet fanner, which may be magnetic, is positioned close to the pallet to facilitate separation of the upper sheets from the stack. The uppermost sheet is then engaged by either a magnetic or suction-type gripper which will lift the uppermost sheet vertically from the stack, and free from the pallet and associated pins.

Improvements to this process can be realized by utilizing specialized magnetic pallet pins of the type described herein.

SUMMARY OF THE INVENTION

The invention is a new type of pallet pin which contains an integral rotating magnet assembly. The integral magnet assembly is mounted within an inner cylindrical cavity of the pin and is attached to an axially extending member which is coaxial with the pin's circumference. Although the magnet is of approximately the same length as the pin's cylindrical length, it occupies only a portion of the circumference defined by the interior of the cylinder.

Magnetic pallet pins of this description are substituted for traditional non-magnetic pallet pins in one or more locations around the perimeter of the pallet. The internal magnet assemblies are rotatable within the cylinder, and thereby positioned either away from or adjacent to the sheets of metal carried by the pallet. When the magnets are rotated into a position in proximity to the sheets in the stack, the sheets are temporarily magnetized such that identical magnetic polarity exists at the edges of the sheet proximate to the pallet pin. This causes the sheets to repel one another and separate, thereby facilitating their removal from the stack.

BRIEF DESCRIPTION OF THE DRAWINGS

FIG. 3 is a top view of the invention.

FIG. 4 is a top view of the invention, minus the upper components, revealing the placement and orientation of the internal magnets.

FIG. 5 is a bottom view of the invention.

FIG. 6 is a perspective view of the internal components of the invention.

DESCRIPTION OF THE PREFERRED EMBODIMENT

Figure 1:
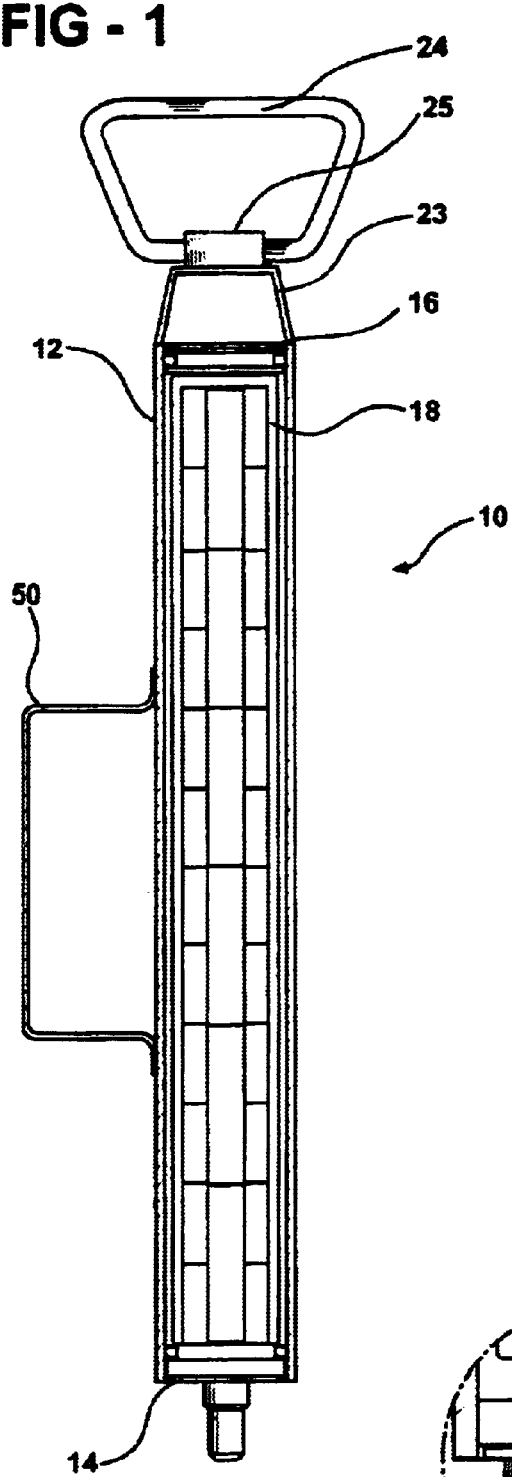
FIG. 1 is a cutaway side view of the invention showing the pallet pin and its internal magnet.

The invention and its objects will be best understood first by reference to FIG. 1 and FIG. 4, showing the magnetic pallet pin assembly 10 consisting of a preferably stainless steel cylindrical housing 12 having a bottom plug 14, a top bushing 16 and upper housing element 23. All of the foregoing housing elements serve to house rotating center element 30 to which are affixed one or more magnetic elements 20 and 22 positioned along the longitudinal axis of element 30 and affixed to it by suitable means. A portion of the interior cavity 18 of housing 12 defines a space opposite the magnetic elements. Rotatable center element 30 is affixed through bushing 16 to a lifting element 24. Center element 30, with attached magnets 20 and 22 is rotatable relative to housing 12 by manually rotating element 24 around the central longitudinal axis of housing 12. Such rotation of element 24 serves to reposition magnets 20 and 22 in relation to the circumference of housing 12, permitting the operator to selectively position magnets 20 and 22 in relation to housing 12.

Figure 2:
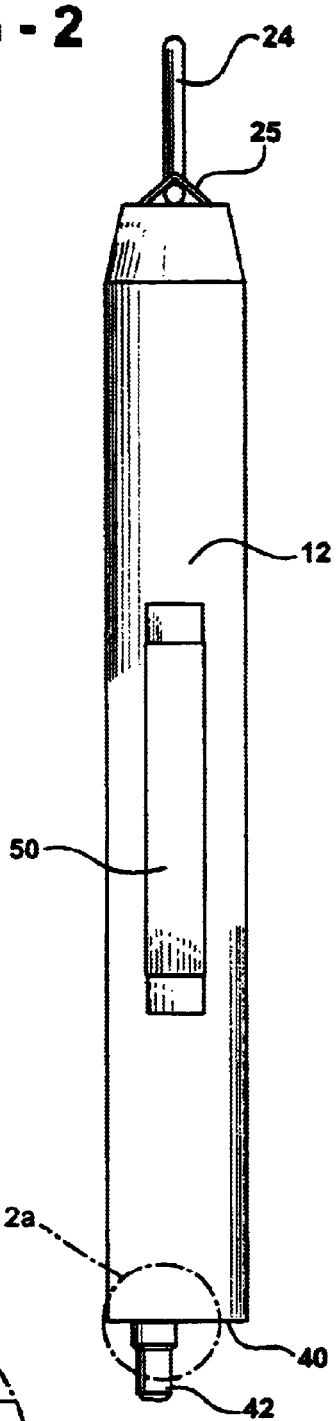
FIG. 2 is an elevation view of the invention.

Housing 12 is further provided, as shown in FIG. 2, with a fastening surface 40 and locating pin 42 adapted to engage with a cavity (70) on a corresponding pallet (64).

Rotation of the center element 30 and its associated magnets, accordingly, serves to move the magnetic elements 20 and 22 of the invention nearer or further from the metal sheets which a plurality of the pallet pins surrounds, when placed in position on a typical sheet-carrying pallet. Rotation of the center element 30 to a position in proximity to the sheets thereby serves to separate the upper sheets from the stack as the sheets become magnetized. The number of pallet pins utilized for this purpose on any pallet is regulated by the size and weight of the sheets to be separated, and the degree of separation required. It will be appreciated by those skilled in the art, however, that it is necessary to use pairs of pallet pins for each application, one such pallet pin providing a north polarity and one such pallet pin providing a south polarity.

The details of the operation of the invention can be further understood by reference to FIG. 6, which shows in perspective, element 30, a plurality of magnetic elements 20 and secondary magnetic elements 22. Magnetic elements 20 and 22 can be seen in top view in FIG. 4. By utilizing progressively smaller cross sections for magnetic elements 20 and 22, it can be seen that it is possible to place magnetic elements 22 in relatively close proximity to the side wall of cylindrical housing 12, thereby bringing magnetic elements 22 in proximity to the sheets which will be fanned by operation of the invention. As is depicted in FIG. 6, there are preferably a plurality of primary magnetic elements 20 arrayed from the top to the bottom of rotating element 30. A plurality of secondary magnetic elements 22 are then affixed to magnetic elements 20. The magnetic elements 20 and 22 are oriented so as to place the north pole of magnetic elements 22 outermost, in certain assemblies 10, while orienting all of the south poles outermost in others. This will insure that the sheet fanners, when operated in pairs, will suitably magnetize sheets to create the desired fanning affect.

The assemblies 10 formed of rotating element 30 and magnetic elements 20 and 22 is placed within the interior cavity 18 of housing 12. Rotating element 30 is attached to upper housing element 23, which in turn, is attached to pivot channel 25. Rotating handle 24, preferably circular in cross-section, is fitted into channel 25, and is permitted to rotate within channel 25 to permit handle 24 to be folded downward out of the way during storage or operation of the system.

Figure 2A:
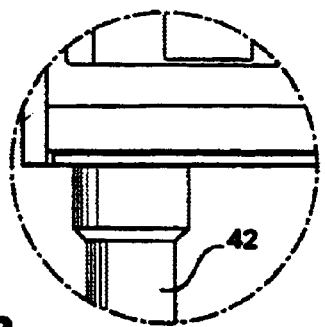
FIG. 2A is a close-up view of the bottom portion of the invention.

Typically, each pin fanner magnet assembly 10 is provided with a locating pin 42 which may be hexagonal, round or T-shaped in cross-section. As shown in FIG. 2 and FIG. 2A, the locating pin 42 is provided to engage each pin fanner assembly 10 with a cavity on a corresponding pallet. In this fashion, each assembly 10 remains securely positioned in relation to said pallet, ideally proximate to a station for the placement of sheets to be fanned.

Figure 8:
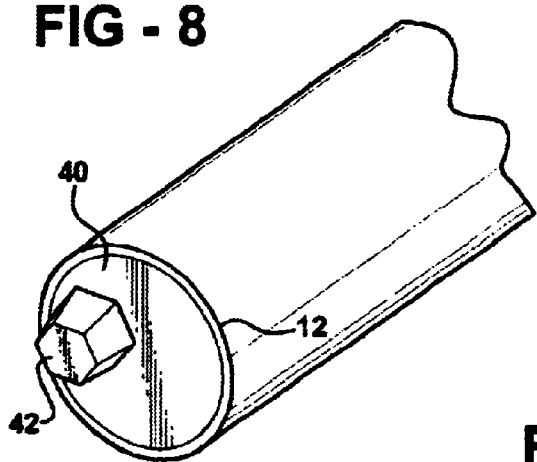
FIG. 8 is a perspective view of the invention showing a hexagonal locating pin.
Figure 9:
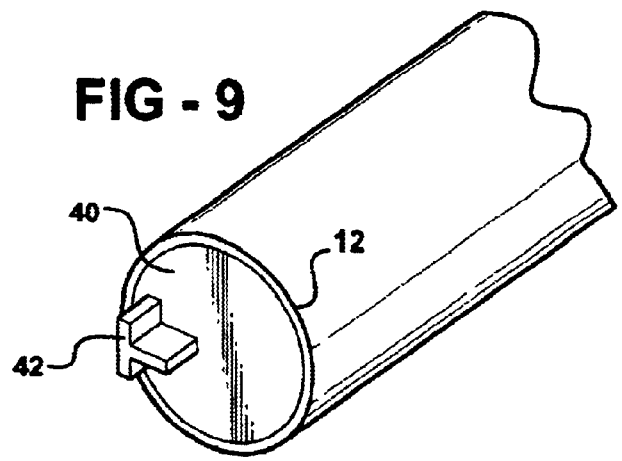
FIG. 9 is a perspective view of the invention showing a T-shaped locating pin.

Hexagonal and T-shaped locating pins, as shown in FIGS. 8 and 9, provide the additional advantage of being able to secure the housing of assembly 10 from rotation once the assembly 10 has been placed in position on the pallet. As shown in FIG. 5, by placing the locating pin 42 off the center axis of the assembly 10, the assembly 10 may be rotated to a position closer to or more remote from the edge of a sheet of workpieces placed on the pallet.

To facilitate lifting, carrying and positioning of the assembly 10, each assembly 10 is provided with a lifting handle 50 which is secured to the exterior of the cylindrical housing 12 by fasteners, welding, adhesives or other acceptable fastening means.

Also in this embodiment, upper housing element 23 is provided with a marker 48, indicating the active position of the array of magnets 20 and 22 contained within the housing 12. This visual indicator permits the operator to readily ascertain the position of the magnetic array in relation to both the housing 12 and the workpieces being formed.

Figure 7:
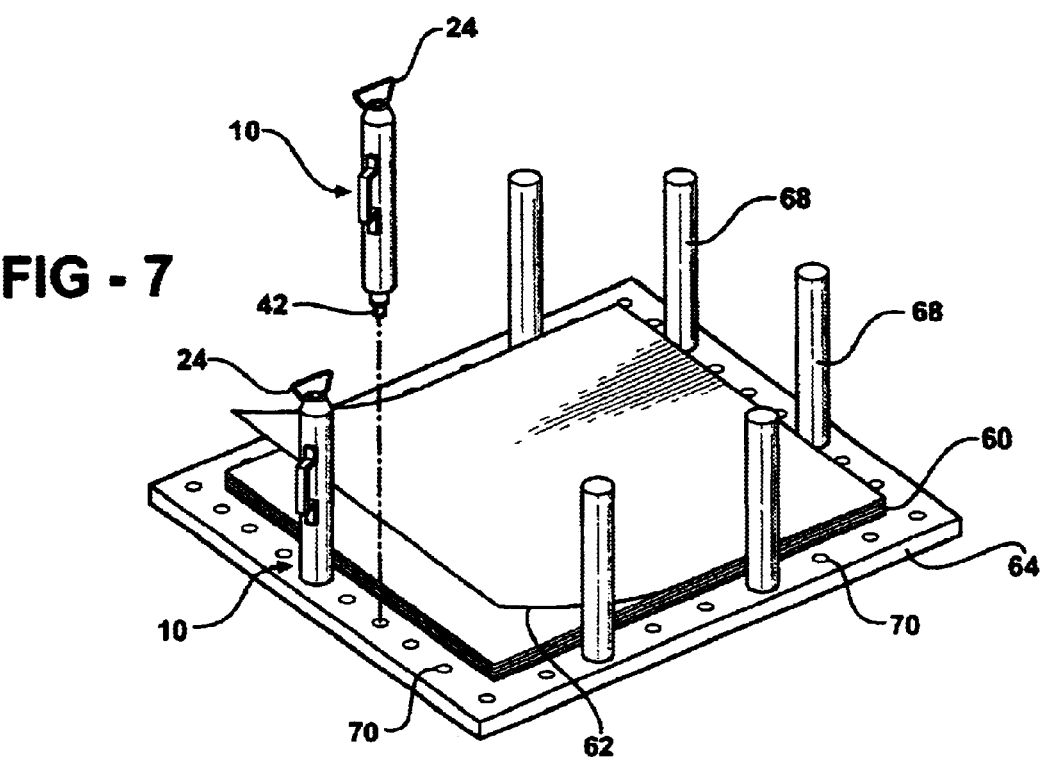
FIG. 7 is a perspective view, showing a typical application of the invention in relation to a pallet and associated workpieces.

In operation, as shown in FIG. 7, a stack 60 containing a plurality of workpieces 62 is positioned on a non-magnetic pallet 64. A pair of magnetic pallet pin assemblies 10 are secured in cavities 70 provided on such pallet, by engagement of locating pins 42. The internal magnetic elements and rotating element are oriented by rotating handles 24 to position the magnetic elements adjacent the edge of the workpieces 62. The magnetic field induced in the workpieces 62 creates like polarity at the edges of said workpieces 62 adjacent to each assembly 10, causing the workpieces to repel one another and separate. Once separated, the workpieces may be easily grasped and separated from the stack of workpieces 62 by gripping arms, suction cups, or comparable lifting devices. Further rotation of handle 24 and upper housing element 23 through an arc of 180 degrees locates the internal magnetic elements on the side of the assembly 10 opposite the workpieces 62, resulting in the loss of the effective magnetic field affecting the workpieces 62, and allowing the workpieces 62 to again collapse to an unseparated stack.

It will also be appreciated from examining FIG. 7, that the positioning of the stack 60 of workpieces 62 in relation to the pallet 64 is aided by one or more non-magnetic pallet pins 68 which engage cavities 70, thereby limiting the horizontal movement of workpieces 60 in relation to stack 64. And, although cavities 70 are depicted in FIG. 7 as cylindrical, such cavities may, in alternative embodiments, be hexagonal, T-shaped, or otherwise configured so as to perform the function of locating desired points on the outer circumference of assemblies 10 and pins 68 in relation to the edges of the stacks 60. By providing assemblies 10 and pins 68 with locating pins 42 which are offset from the central axis of assemblies 10 and pins 68, as shown in detail in FIG. 2A, the central longitudinal axes of assemblies 10 and pins 68 may be positioned closer to or further away from the edges of stack 60. In this fashion, stack 60 may be restrained from horizontal movement in relationship to pallet 64, but still be provided sufficient clearance from pins 68 and assemblies 10 to permit effective fanning action, and allow workpieces 62 to be lifted from the stack 60.

Having thus described selective embodiments of my invention in sufficient detail as to permit those skilled in the art to benefit therefrom, it will nevertheless be obvious to those skilled in the art that numerous modifications may be made thereto, without deviating from the invention which I claim as follows:

1. A device for facilitating separation of individual sheets from a stack of sheets of ferro-magnetic material comprising an elongated housing, an elongated array of magnets disposed within said housing, positioning means for selectively positioning said array of magnets within said housing, and locating means for removably securing said housing in fixed relation to said stack of sheets.

2. The device of claim 1, which further comprises indicating means for indicating the position of said array of magnets in relation to said housing.

3. A device for facilitating separation of individual sheets from a stack of sheets of ferro-magnetic material comprising an elongated cylindrical housing, a rotatable, elongated array of permanent magnets disposed within said housing, a handle for rotating said array in relation to said housing, locating means for removably positioning said housing in relation to said stack of sheets of ferro-magnetic material, and indicating means for indicating the position of said array of permanent magnets in relation to said housing.

4. The device of claim 3, wherein said array of permanent magnets further comprises a first row of magnets affixed to an elongate pole piece and a second row of magnets affixed to said first row of magnets.

5. The device of claim 4, wherein said second row of magnets is of smaller width and height than said first row of magnets.

6. The device of claim 3, wherein said locating means comprises a locating pin positioned on the bottom of said cylindrical housing.

7. The device of claim 6, wherein the longitudinal axis of said locating pin is positioned parallel to the longitudinal axis of said cylindrical housing, but not co-axially with said longitudinal axis of said cylindrical housing.

8. The device of claim 6, wherein said locating pin is substantially hexagonal in cross-section.

9. The device of claim 6, wherein said locating pin is substantially T-shaped in cross-section.

10. The device of claim 3, further comprising a second handle affixed to said cylindrical housing whereby said cylindrical housing may be carried and positioned.

* * * * *